J. L. KOLLENBORN.
VEHICLE CANOPY.
APPLICATION FILED JUNE 14, 1912.
1,130,299.
Patented Mar. 2, 1915.
3 SHEETS—SHEET 1.
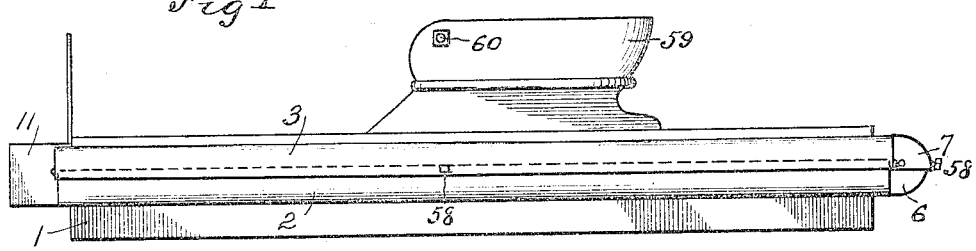
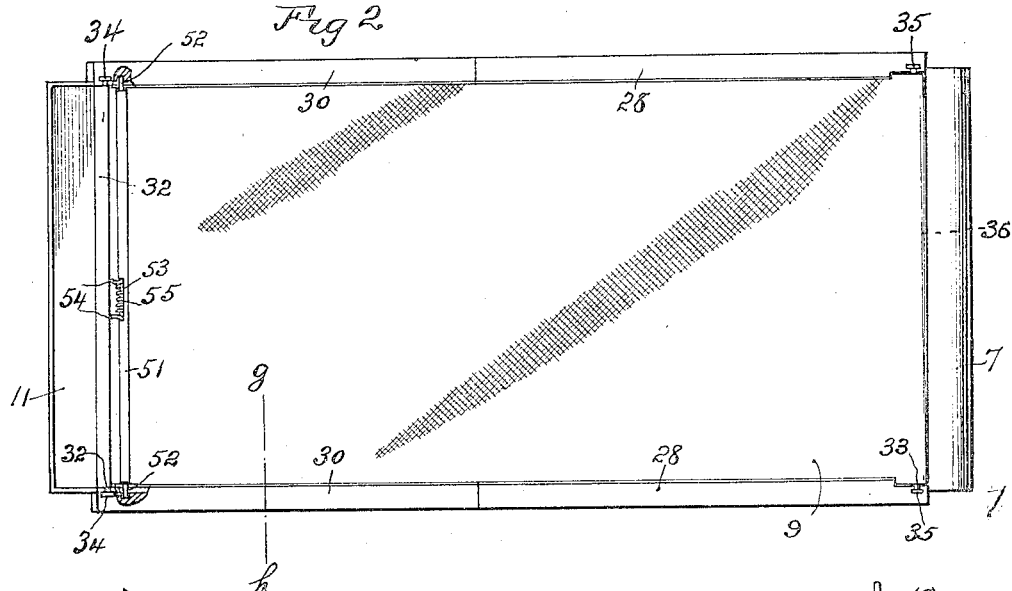
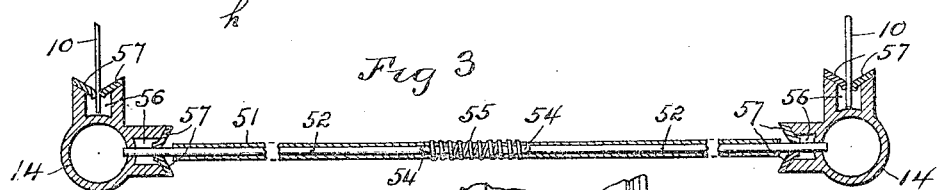
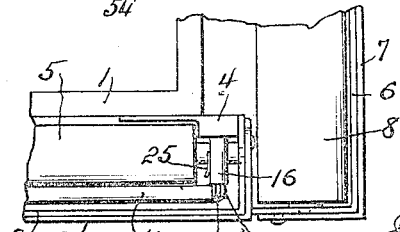
WITNESSES:
R. E. Hamilton
E. B. House
INVENTOR.
John L. Kollenborn
BY Warren D. House
His ATTORNEY.

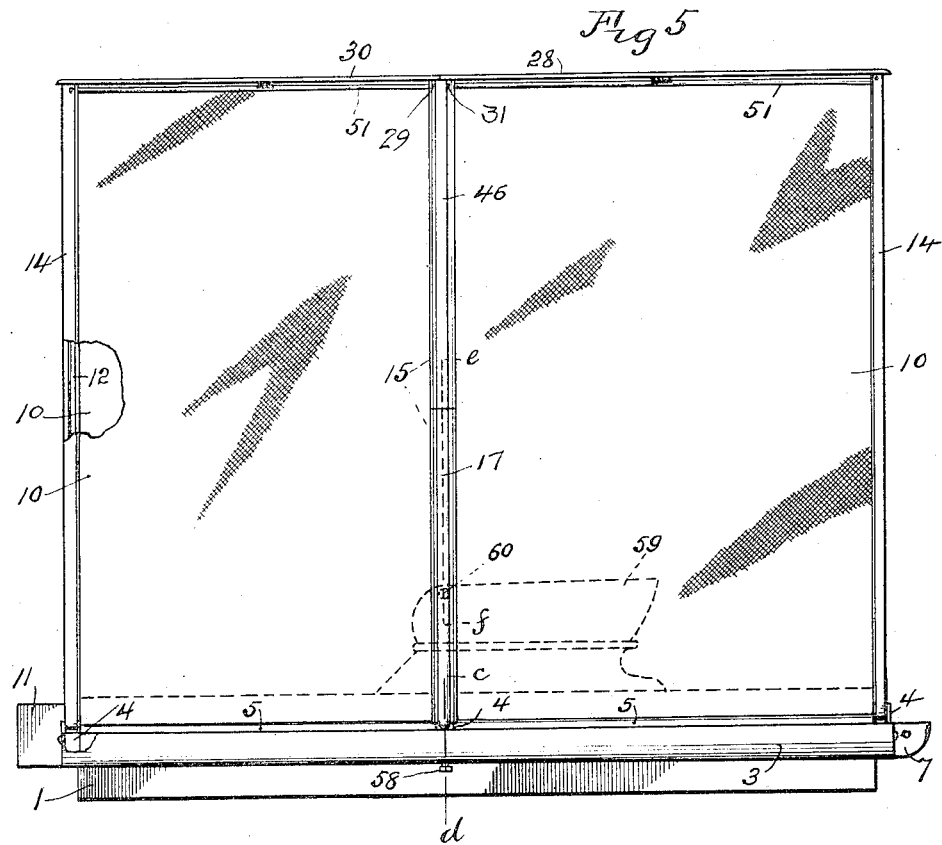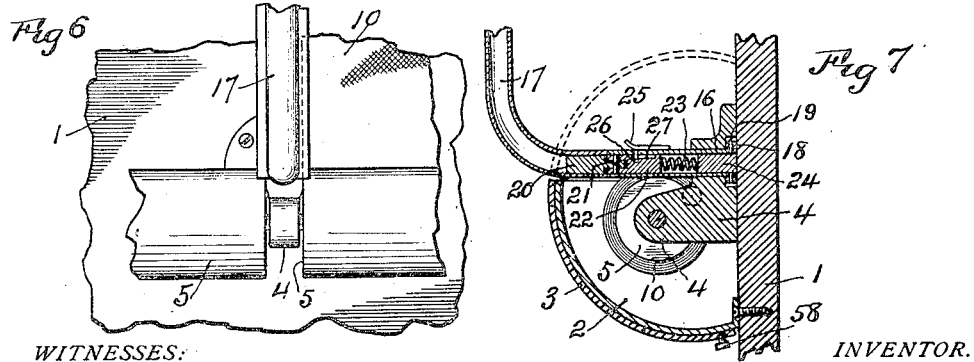

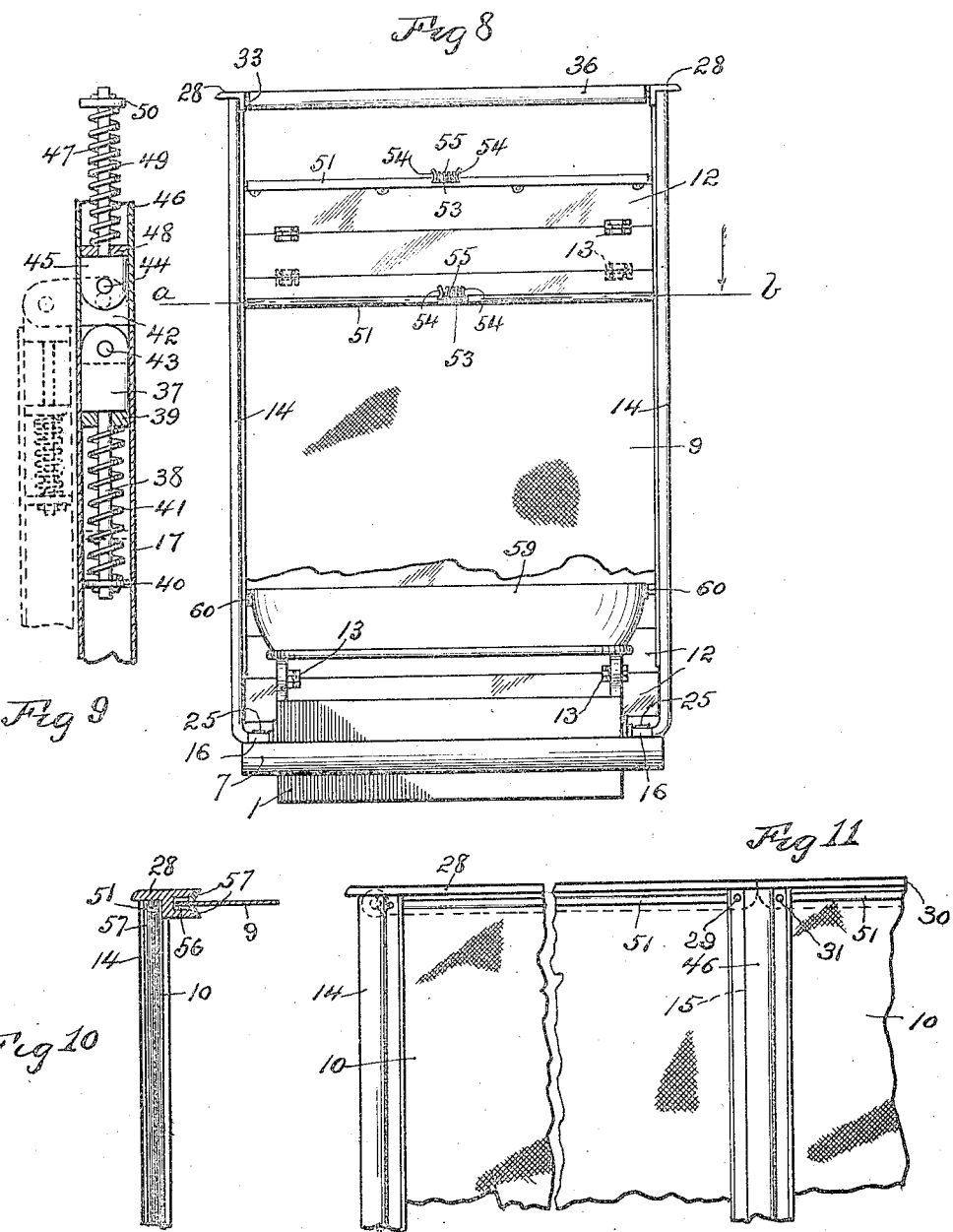

UNITED STATES PATENT OFFICE.

JOHN L. KOLLENBORN, OF KANSAS CITY, MISSOURI.

VEHICLE-CANOPY.

1,130,299.  Specification of Letters Patent.  Patented Mar. 2, 1915.

Application filed June 14, 1912. Serial No. 703,665.

*To all whom it may concern:*

Be it known that I, JOHN L. KOLLENBORN, a citizen of the United States, and a resident of Kansas City, in the county of Jackson and State of Missouri, have invented certain new and useful Improvements in Vehicle-Canopies, of which the following is a specification.

My invention relates to improvements in vehicle canopies.

The object of my invention is to provide a novel vehicle canopy which may be collapsed and stored in small space in suitable housing means carried by the vehicle, and which may be easily and quickly extended to operative position for the purpose of providing top and side coverings for the vehicle.

Other novel features of my invention are hereinafter fully described and claimed.

In the accompanying drawings which illustrate the preferred embodiment of my invention, Figure 1 is a side elevation of the body of a vehicle provided with my improvement, the canopy being shown in the knockdown or stored condition, the closures for the housings being shown in the closed positions. Fig. 2 is a top view of the mechanism, the canopy being shown in the extended position, portions being broken away. Fig. 3 is an enlarged horizontal section on the line *a—b* of Fig. 8. Fig. 4 is an enlarged fragmental top view of one portion of the body of the vehicle and parts attached thereto. Fig. 5 is a side elevation of the mechanism shown in the operative extended position, portions being broken away. Fig. 6 is an enlarged side elevation of portions of the two rollers at one side of the vehicle and parts adjacent thereto. Fig. 7 is an enlarged vertical section on the line *c—d* of Fig. 5. Fig. 8 is a rear end elevation showing the frame in the extended or operative position, the front and rear curtains being partly elevated, and the rear curtain being broken away. Fig. 9 is an enlarged vertical section on the line *e—f* of Fig. 5. Fig. 10 is a vertical section on the line *g—h* of Fig. 2. Fig. 11 is an enlarged fragmental side elevation view of part of the canopy.

Similar characters of reference designate similar parts in the different views.

1 designates a vehicle box or body. Two housings 2 are secured respectively to opposite sides of the body 1. These housings may each be of any desired shape. As shown they are each in the form of a gutter with closed ends and an open top. Each housing 2 has pivoted to its ends the ends of a curved closure 3 which is adapted to be moved to the position shown in dotted lines in Fig. 7 so as to cover the housing opening, and which is provided with downwardly turned ends respectively pivoted to the ends of the housing. In each housing secured to the body 1 adjacent the ends respectively of the housing and near the middle of the housing 2 are bearings 4, best shown in Fig. 7. In each housing 2 are two curtain rollers 5, of the spring actuated "Hartshorn" type. One set of ends of each pair of rollers 5 is mounted in the central bearing 4, the other set of ends being mounted respectively in the outer bearings 4. Secured to the rear end of the body 1 is another housing 6 constructed similarly to the housings 2 and having a top opening adapted to be covered with a closure 7 similar to the closures 3 already described. A curtain roller 8 is mounted in the housing 6 and has its ends supported respectively by the ends of said housing. The roller 8 is similar to the rollers 5 and has secured to it a curtain 9. The rollers 5 have respectively secured to them curtains 10.

At the forward end of the body 1 is provided an open top box 11 adapted to receive therein a curtain 12, preferably formed of a plurality of transparent plates, the horizontal edges of which are hinged to the edges of adjacent plates by hinges 13 which will permit the plates of the curtain 12 to lie folded one on the other in the box 11 when the curtain or shield, as it may be called, is collapsed.

To support the curtains 10, 9 and 12 in the upright operative positions, shown in Figs. 5 and 8, I provide a collapsible frame, which when the curtains are lowered, may be stored in the housings 2, in the manner about to be described. This collapsible frame comprises, preferably, the following described parts: Four corner standards 14 are provided, one adjacent each corner of the body 1 of the vehicle. The front and rear posts 14 at each side of the body are respectively pivoted in the bearings 4 which are adjacent to the ends of the housing 2 in which said bearings are located. Said standards 14 are so pivoted to said bearings as to be adapted to be swung from a vertical position, as shown in Fig. 5 to a horizontal position in the housing. Two middle standards 15 disposed at opposite sides of the body, are respectively pivoted in the middle bearings 4 in the housings 2.

In Fig. 7 I have shown the manner of pivoting of one of the middle standards 15 to the middle bearing 4. The other standard 15 and each of the standards 14 is pivoted in the same manner to the adjacent bearing 4, so that a description of one will suffice for each. Referring particularly to Fig. 7, it will be noted that the bearing 4 has pivotally mounted in it the inner end of a horizontal outwardly projecting tube 16, the outer end of which abuts against the lower end of a tubular member 17, which forms the lower portion of the standard 15. The inner end of the tube 16 has secured to it a collar 18 which is located in a recess 19 in the inner side of the bearing 4 and serves to hold the tube 16 from withdrawal, but permits turning in the bearing 4. In the member 17 is secured a hinge member 20 which is pivoted by means of a transverse pin 21 to another hinge member 22 which is longitudinally slidably mounted in the tube 16. A coil spring 23 in the tube 16 has its forward end bearing against the hinge member 22 and its rear end bearing against a short plug or block 24 in the tube 16 and which bears against the body 1. The tension of the spring 23 is such as tends to force the hinge members 20 and 22 outwardly. To hold said members from being forced outwardly, a spring catch 25 is secured at one end to the outer side of the tube 16. The free end of said catch is provided with a projection 26 which extends through an opening in the tube 16 and is adapted to enter a notch in the hinge member 22 for holding said hinge member in the retracted position shown in Fig. 7. The hinge member 22 is provided with a longitudinal groove 27 the outer end of which terminates in the notch which receives the projection 26.

To dispose the standard 15 in the housing 2, or to store any one of the standards 14 in their housings, it may be done by following the steps to be now described.

The catch 25 has its free end swung upwardly so as to withdraw the projection 26 from the notch in the member 22. The member 17 together with the hinge members 20 and 22 will then be forced outwardly until the hinge pin 21 is clear of the tube 16, the projection 26 following along the groove 27. The member 17 may now be swung on the pin 21 to a position at right angles to the position shown in Fig. 7, after which the member 17 and the tube 16 may be turned to positions such that the standard will lie lengthwise in the housing 2 parallel with the curtain rollers. To mount the standards in a vertical position, the reverse of these above described steps is to be followed. In Fig. 4 I have shown one of the rear standards 14 in the collapsed position in its housing.

After the standards 14 and 15 are mounted in the operative or extended positions, it is necessary to releasably hold them in such positions so that the curtains may be supported in the elevated positions. Hinged at one set of ends respectively to the rear standards 14 are bars 28 which are adapted to be swung from positions parallel with the standards 14 to positions at right angles thereto, as shown in Figs. 2, 5 and 11. In the last named positions the forward ends of the bars 28 are adapted to be releasably secured respectively to the upper ends of the middle standards 15 by removable pins 29. Bars 30 are in like manner pivoted at one set of ends to the upper ends of standards 14 respectively, which are located at the forward corners of the body 1. The bars 30 are also adapted to be releasably locked to the upper portions of the standards 15 respectively by removable pins 31.

After the bars 28 and bars 30 have been secured in the horizontal positions to the standards 15, the standards may be connected together to prevent lateral outward movement at their upper ends by two bars 32 and 33. The bar 32 has its ends formed T shape so as to fit in vertical T shaped grooves in the inner sides respectively of the bars 30, said grooves extend downwardly from the upper sides of the bars 30, and are denoted by 34. In like manner the rear bar 33 is provided with T shaped ends adapted to removably fit in grooves 35 similar to the grooves 34 and provided in the inner sides of the bars 28, as shown in Fig. 2. On the bar 33 is rotatively mounted a roller 36 over which the curtain 9 is adapted to pass.

In order that the standards 15 may be disposed in the housings 2, each of these standards comprises the following described parts: A lower tubular member 17, as shown in Fig. 9, has longitudinally slidable in it a hinge member 37 provided at its lower end with a shank 38 slidable in a block 39 secured in the tubular member 17. The shank 38 below the block 39 has secured on it a collar 40 against which bears the lower end of a coil spring 41 which encircles the shank 38 and has its upper end bearing against the block 39. The other end of the hinge member 37 is pivoted to an intermediate hinge member 42 by a pin 43, said intermediate member being hinged by a pin 44 to another hinge member 45 slidably mounted in the upper member 46 of the standard 15. The member 45 is provided with an upwardly extending shank 47 which is slidable through a block 48 secured in the tubular member 46 just referred to. A coil spring 49 encircles the shank 47 and has one end bearing against the block 48 and the other end bearing against the collar 50 which is secured on the shank 47.

By drawing the member 46 away from the member 17 both members 37 and 45 may be withdrawn from the members 17 and 46 respectively to such positions that the intermediate member 42 will be outside the members 37 and 45, after which the member 46 may be swung to a position alongside the member 17, as shown in Fig. 9. When in this position, the standard 15 may be swung in the manner already described to a position in the adjacent housing 2.

Each of the curtains 9, 10 and 12 is preferably firmly secured at its free end to a transverse tube 51, as is shown for example in Fig. 3. Longitudinally slidable in the tube 51 are two rods 52, the outer ends of which project beyond the tube 51 and are adapted to be inserted in holes provided therefor in the standards 14 and 15 and in the bars 30. The inner ends of the rods 52 are bent laterally and extend through a slot 53 provided in the middle portion of each tube 51. Between each pair of arms 54, which are thus provided at the inner ends of the rods 52 is mounted a coil spring 55 which normally forces the rods 52 outwardly into positions in which they can enter the holes provided in the standards 14 and 15 to receive them. By forcing the arms 54 toward each other the rods 52 may be withdrawn from the holes in the standards, after which the curtain may be lowered into the housing adapted to receive it.

The inner sides of the standards 14 and of the bars 28 and 30 are provided each, as are opposite sides of the members 17 and 46 of the standards 15, with longitudinal grooves 56 which are adapted to have the curtains slide therein. Said members 14, 28, 30, 17 and 46 may also be provided at opposite sides of each groove 56 therein with leather or soft rubber weather strips 57 adapted to bear against opposite sides of a curtain to hold the same in place and to exclude the weather.

The closures 3 and 7 may be provided each with a set screw 58 adapted to bear against the adjacent housing to secure the closure in the closed position shown in Fig. 1.

In operating my invention, to put up the canopy, the closures 3 and 7 are first swung to the open positions, after which the standards 14 and 15 are swung to the upright positions and then locked in such positions by swinging the bars 28 and 30 to the horizontal positions and locking them in such positions to the members 46 by means of the pins 29 and 31 respectively which are inserted through holes provided in the bars 28 and 30 and the members 46. The T shaped ends of the bars 32 and 33 are then slid respectively into the grooves 34 and 35 of the bars 30 and 28. The curtain 9 is then drawn from the roller 8 upwardly to and over the roller 36 and then horizontally forward to a point adjacent to the bar 32 where the rods 52 of the curtain 9 are permitted to enter holes provided therefor in the inner sides of the bars 30, as shown in Fig. 2 to hold the curtain in the position to which it has been adjusted. In like manner the curtains 10 and 12 are withdrawn from the receptacles 2 and 11 which contain them, and are elevated to the desired positions, the standards 14 and 15 being provided at suitable places with holes for receiving the rods 52 of said curtains.

The ends of the vehicle seat 59 may be provided respectively with outwardly extending pins 60 adapted to respectively enter holes provided therefor in the inner sides of the members 17 to hold the frame from forward and backward swinging.

When the frame is collapsed and the curtains and other parts are stored in the housing means comprising the housings 2 and 6 and the box 11, and the closures 3 and 7 have been moved to the closed positions, shown in Fig. 1, the canopy is stored in compact form with the parts which are liable to injury by exposure to the elements fully protected and out of sight.

I do not limit my invention to the structure shown and described, as modifications, within the scope of the appended claims, may be made without departing from the spirit of my invention.

Having thus described my invention, what I claim and desire to secure by Letters Patent, is:—

1. In a vehicle canopy, the combination with the body of a vehicle, of three housings disposed respectively at opposite sides and at the rear of and supported by said body, corner standards pivoted respectively to said body and adapted to be swung from vertical positions to longitudinal horizontal positions within the adjacent side housings, releasable bracing devices respectively connecting the rear corner standards with the forward corner standards, two transverse brace members disposed respectively adjacent to the rear and forward standards and having means for being detachably secured to said bracing devices, a roller mounted in the rear housing, a curtain secured to and adapted to be wound on said roller and being adapted to be extended upwardly to and over the rear transverse brace member, and means for releasably attaching said curtain to said bracing devices adjacent to the forward transverse brace member.

2. In a vehicle canopy, the combination with the body of a vehicle of two housings disposed respectively at opposite sides of and supported by the body, corner standards respectively pivoted to the body and adapted to be swung from vertical positions to longitudinal horizontal positions within the adjacent housings, releasable bracing devices respectively connecting the rear corner standards with the forward corner standards, two transverse brace members disposed respectively adjacent to the rear and forward standards and having means for being detachably secured to said bracing devices, intermediate standards pivoted to said body and adapted to be releasably secured respectively to said bracing devices, said intermediate standards being foldable and adapted to be swung from the vertical position to horizontal positions in said housings respectively, rollers in said housings respectively and disposed respectively intermediate of the corner and intermediate standards, four curtains respectively attached at one set of ends to said rollers, and means for respectively securing the other set of ends of said curtains to the adjacent corner and intermediate standards adjacent to the upper ends thereof, when said standards are in the vertical position.

3. In a vehicle canopy, the combination with the body of a vehicle, of housing means carried thereby, a collapsible frame pivotally supported by the body and having means for being releasably locked in an upright operative position and adapted to be swung downwardly into said housing means, curtains adapted to be stored in said housing means and provided with means for being extended and to be supported by said frame in the extended position, and sealing means carried by the frame for engaging the opposite sides of said curtains adjacent to the longitudinal edges thereof, and with which the curtains have slidable engagement.

4. In a vehicle canopy, the combination with the body of a vehicle, of a housing carried thereby, two standards pivoted to the body and adapted to be swung from a vertical position to a horizontal position in the housing, a curtain roller in said housing, a longitudinally extensible curtain attached to and adapted to be wound on said roller, releasable means for holding the standards in the vertical position, and means for fastening the upper end of said curtain when in the extended position to said standards.

5. In a vehicle canopy, the combination with the body of a vehicle, of a housing carried thereby, two standards pivoted to the body and adapted to be swung from a vertical position to a horizontal position in the housing, and provided respectively on adjacent sides with longitudinal grooves, a curtain roller in said housing, a longitudinal extensible curtain attached to and adapted to be wound on said roller and to have its longitudinal edges travel respectively in said grooves, releasable means for holding the standards in the vertical position, and means for fastening the upper end of the curtain, when extended, to said standards.

6. In a vehicle canopy, the combination with the body of a vehicle, of a housing carried thereby, two standards pivoted to the body and adapted to be swung from a vertical position to a horizontal position in the housing, a curtain roller in said housing, a longitudinally extensible curtain attached to and adapted to be wound on said roller, releasable means for holding the standards in the vertical position, means for fastening the upper ends of the curtain, when in the extended position, to said standards, and two pairs of weather strips secured one pair to each standard and the strips of each pair being adapted to respectively slidably engage opposite sides of the curtain when the curtain is extended.

In testimony whereof I have signed my name to this specification in the presence of two subscribing witnesses.

JOHN L. KOLLENBORN.

Witnesses:
E. B. HOUSE,
JAMES H. MORGAN.